US012722490B1

(12) United States Patent
Lei

(10) Patent No.: US 12,722,490 B1
(45) Date of Patent: Sep. 1, 2026

(54) RECORDER SECURITY HEAD-UP DISPLAY METHOD AND SYSTEM

(71) Applicant: Shenzhen Dazhi Chuangxin Technology Co., Ltd., Shenzhen (CN)

(72) Inventor: Longbiao Lei, Shenzhen City (CN)

(73) Assignee: Shenzhen Dazhi Chuangxin Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/211,303

(22) Filed: May 19, 2025

(51) Int. Cl.
*B60K 35/28* (2024.01)
*B60K 35/23* (2024.01)
*G01S 19/48* (2010.01)

(52) U.S. Cl.
CPC .............. *B60K 35/28* (2024.01); *B60K 35/23* (2024.01); *G01S 19/485* (2020.05)

(58) Field of Classification Search
CPC ........ B60K 35/28; B60K 35/23; G01S 19/485
See application file for complete search history.

(56) References Cited

U.S. PATENT DOCUMENTS 11,381,786 B2 * 7/2022 Robinson, Jr. ......... H04N 7/183
2019/0114689 A1 * 4/2019 Wang ................. G06Q 30/0224
2019/0163985 A1 * 5/2019 Wang ..................... G06Q 30/00
2025/0155962 A1 * 5/2025 Doidge-Harrison .... G06T 11/00

OTHER PUBLICATIONS

Syed et al, T.A. In-Depth Review of Augmented Reality: Tracking Technologies, Development Tools, AR Displays, Collaborative AR, and Security Concerns, Google Scholar, MDPI, Sensors 2023, 23, 146, Dec. 2023, pp. 1-54. (Year: 2023).*

Gabbard et al, J.L. AR DriveSim: An Immersive Driving Simulator for Augmented Reality Head-Up Display Research, Google Scholar, Frontiers, Robotics and AI, vol. 6, Oct. 2019, pp. 1-16. (Year: 2019).*

* cited by examiner

*Primary Examiner* — Russell Frejd
(74) *Attorney, Agent, or Firm* — Che-Yang Chen

(57) ABSTRACT

The present invention provides a recorder security head-up display method, includes: collecting a real-time scene image and a GPS positioning data to construct an initial state set; performing a physical identification on the initial state set to construct an image information set, and combining the GPS positioning data and the image information set to construct a multi-dimensional data set; performing data analysis on the multi-dimensional data set using algorithms to judge a driving state and generate a driving state set; generating a real-time feedback information according to the driving state set; collecting an operation instruction state and generating an instruction information; and performing a user operation according to the instruction information, locking or capturing the current recorded video segment of the camera. This method realizes multi-scenario driving safety protection, greatly improving the accuracy of driving warnings and the reliability of accident evidence collection.

12 Claims, 9 Drawing Sheets collecting a real-time scene image and a GPS positioning data to construct an initial state set performing a physical identification on the initial state set to construct an image information set, and combining the GPS positioning data and the image information set to construct a multi-dimensional data set performing data analysis on the multi-dimensional data set using algorithms to judge a driving state and generate a driving state set generating a real-time feedback information according to the driving state set collecting an operation instruction state and generating an instruction information performing a user operation according to the instruction information, locking or capturing the current recorded video segment of the camera

FIG.1

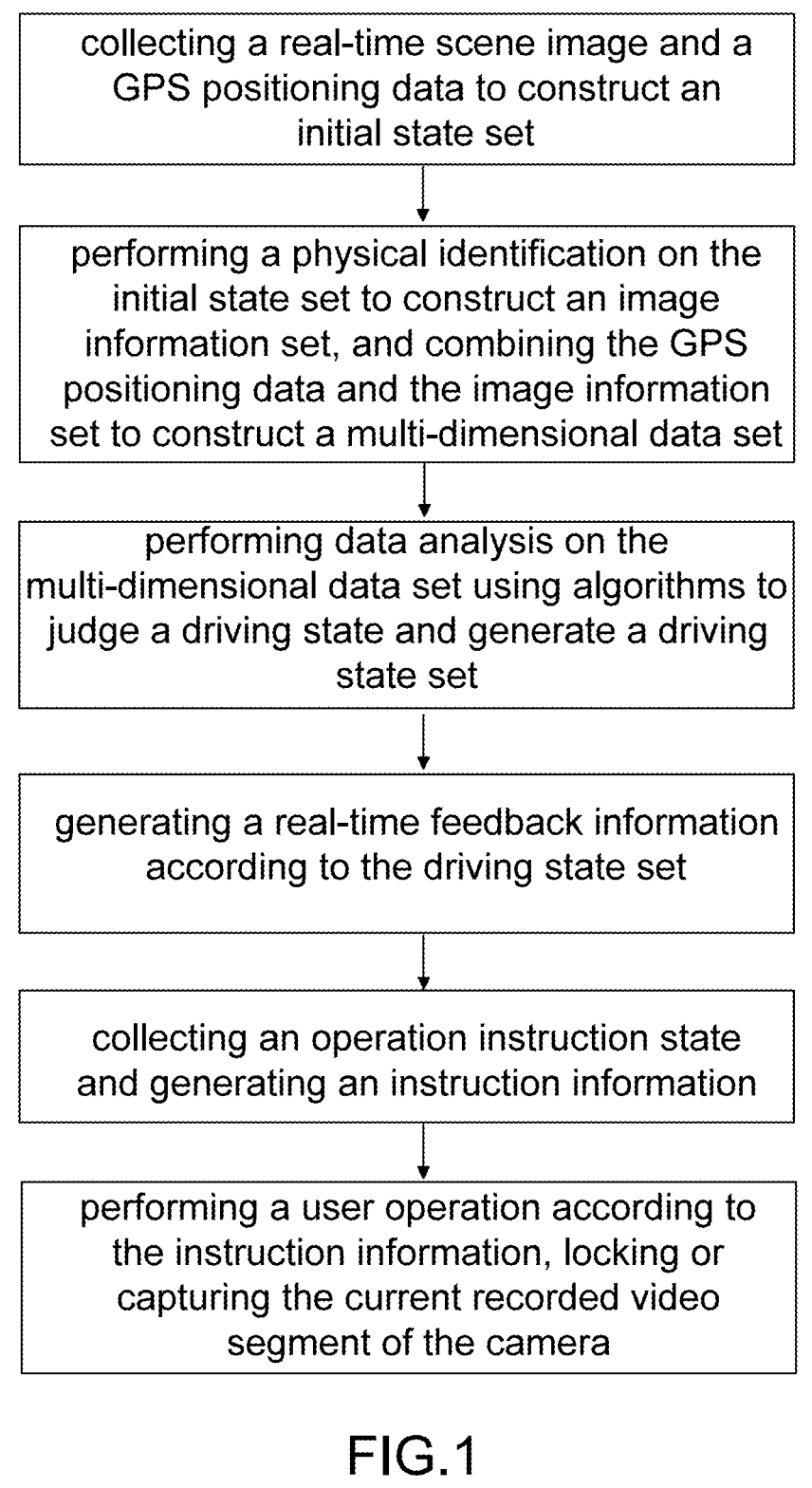

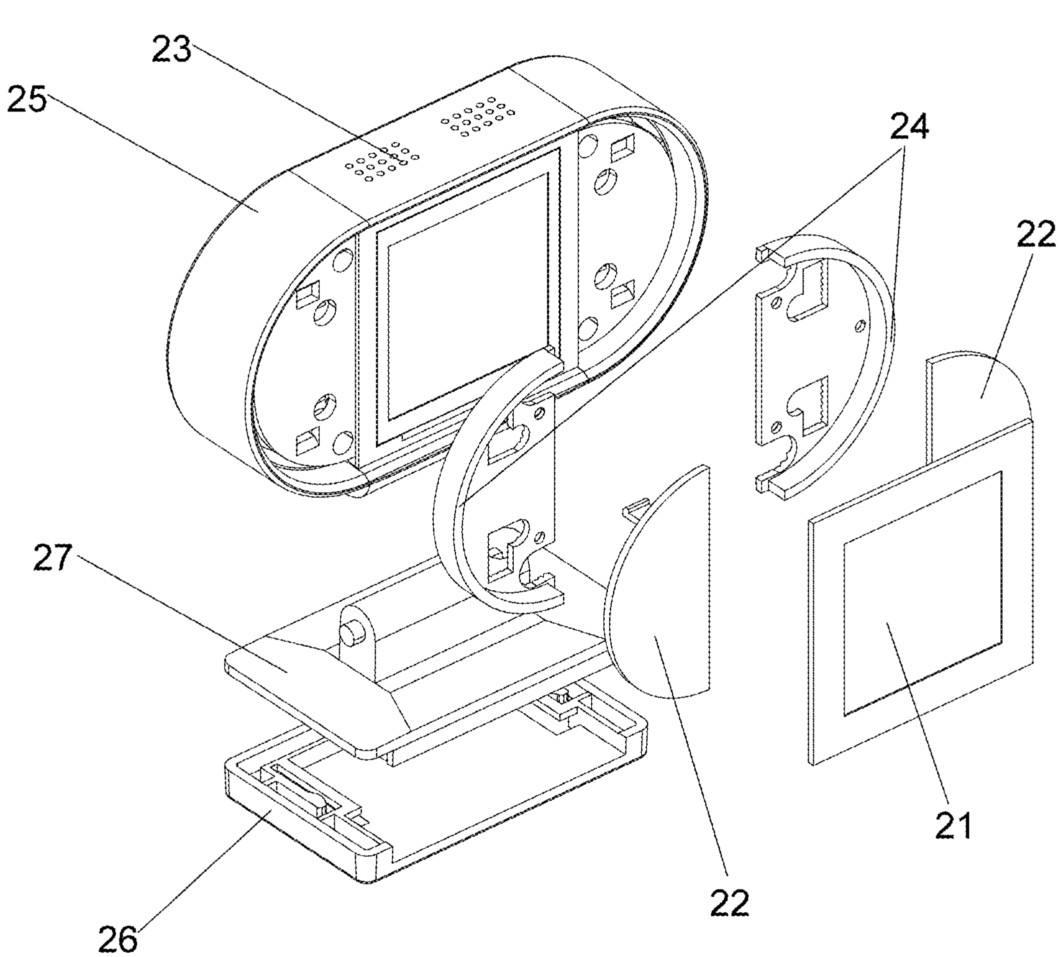
FIG.8

RECORDER SECURITY HEAD-UP DISPLAY METHOD AND SYSTEM

BACKGROUND OF THE PRESENT INVENTION

Field of Invention

The present invention relates to the field of intelligent driving assistance, and in particular to a recorder security head-up display method and system.

Description of Related Arts

With the rapid development of the modern automobile industry and the widespread application of intelligent driving technology, vehicle safety has become a key issue of concern for users and manufacturers. Especially in a complex traffic environment, the driver needs timely information on the driving status in order to make sensible driving decisions. However, since traditional driving assistance systems only present information in a simple way and the driver needs to frequently look down at the dashboard, this increases safety risks during driving.

However, there are certain limitations to the way information is collected and processed by the traditional HUD system. Firstly, the information source is single, mainly relying on vehicle internal sensors, lacking comprehensive perception of the external environment. Secondly, the data processing capacity is insufficient, which makes it difficult to achieve multi-dimensional data fusion and accurate driving status analysis. In addition, there is a lack of intelligent interactive mechanism, which makes it impossible to perform real-time image recording and video locking according to the driver's operational needs.

In other words, the current driving recorders on the market have certain limitations in information processing and functions. First, the data processing capabilities are insufficient, making it difficult to achieve multi-dimensional data fusion and accurate driving status analysis. Secondly, there is a lack of intelligent interactive mechanism. Currently, the driving recorders on the market basically only have video and audio recording functions without other automatic safety reminders, and are basically installed on the front windshield or fixed on the original vehicle's central control rearview mirror, which is inconvenient to view and operate while the vehicle is driving. The current driving recorders lack more usability and cannot prompt the warning of other vehicles approaching from behind and on both sides of the vehicle, which poses a hidden danger to driving safety and insufficient experience in usage scenarios.

SUMMARY OF THE PRESENT INVENTION

Based on the above-mentioned shortcomings of the prior art, the purpose of the present invention is to provide a recorder security head-up display method and system to solve the above-mentioned technical problems.

In order to achieve the above object, the present invention provides a recorder security head-up display method, including:

collecting a real-time scene image and a GPS positioning data to construct an initial state set;

performing a physical identification on the initial state set to construct an image information set, and combining the GPS positioning data and the image information set to construct a multi-dimensional data set;

performing data analysis on the multi-dimensional data set using algorithms to judge a driving state and generate a driving state set;

generating a real-time feedback information according to the driving state set;

collecting an operation instruction state and generating an instruction information; and performing a user operation according to the instruction information, locking or capturing the current recorded video segment of the camera.

The present invention further configures the initial state set: $S_0=\{I_f, I_r, G\}$, wherein $I_f$ is a front camera image, $I_r$ is a rear camera image, and G is a positioning data output by a GPS unit.

The present invention is further configured by performing the physical identification on the initial state set to construct the image information set, constructing the image information set F={V, L, P}, wherein V is a vehicle type, L is a lane type, and P is a pedestrian state; constructing an intermediate state set $S_1=\{F, G\}$ according to the obtained image information set; and performing a multidimensional data fusion on the intermediate state set S to obtain a multi-dimensional data set D={V, L, P, X, Y}, wherein X and Y are the coordinate data provided by GPS.

The present invention is further configured that a driving state set construction logic is: $S_{state}=\{Flag_r, Flag_f, Flag_p, Flag_l, Flag_{ld}, Flag_{start}, Flag_{vb}\}$, wherein $S_{state}$ is the driving state set, $Flag_r$ is a rear vehicle collision pre-warning state, $Flag_r$ is a front vehicle collision pre-warning state, $Flag_p$ is a front pedestrian collision pre-warning state, $Flag_l$ is a left and right lane change auxiliary pre-warning state, $Flag_{ld}$ is a lane departure pre-warning state, $Flag_{start}$ is a front vehicle start state, and $Flag_{vb}$ is a virtual bumper pre-warning state.

The present invention is further configured that a rear vehicle collision pre-warning trigger logic is:

$$\text{Flag}_r = \begin{cases} 1, & v > 30 \wedge TTC_r < 2.7\ s \wedge V \in \{\text{car, truck, bus}\} \\ 0, & \text{otherwise} \end{cases},$$

wherein $Flag_r$ is the rear vehicle collision pre-warning state, v is an own vehicle speed, $TTC_r$ is a rear vehicle collision time, wherein a rear vehicle collision time calculation logic is:

$$TTC_r = \frac{d_r}{|\Delta v_r|},$$

wherein $d_r$ is a distance to the rear vehicle, $|\Delta v_r|=v-v_r$ is a relative speed between the own vehicle and the rear vehicle, $v_r$ is a rear vehicle speed, and V is the vehicle type; wherein a front vehicle collision pre-warning trigger logic is:

$$\text{Flag}_r = \begin{cases} 1, & v > 30 \wedge TTC_r < 2.7\ s \wedge V \in \{\text{car, truck, bus}\} \\ 0, & otherwis \end{cases},$$

$Flag_f$ is the front vehicle collision pre-warning state, $TTC_f$ is a front vehicle collision time, wherein a front vehicle collision time calculation logic is:

$$TTC_f = \frac{d_f}{|\Delta v_f|},$$

$d_f$ is a distance to the front vehicle, $|\Delta v_f = v - v_f$ is a relative speed between the own vehicle and the front vehicle, and $v_f$ is a front vehicle speed.

The present invention is further configured that a pedestrian collision pre-warning trigger logic is:

$$\text{Flag}_p = \begin{cases} 1, v > 10 \wedge TTC_p < 1.3 \text{ s} \wedge \Delta d_p < 0 \wedge P \in \begin{Bmatrix} \text{standing, holding an} \\ \text{umbrella, walking,} \\ \text{riding a bicycle,} \\ \text{riding a motercycle} \end{Bmatrix} \\ 0, \text{otherwise} \end{cases}$$

wherein $\text{Flag}_p$ is a pedestrian collision pre-warning state, v is an own vehicle speed, $TTC_p$ is a pedestrian collision time, wherein $$TTC_p = \frac{d_p}{v},$$

wherein $d_p$ is a pedestrian distance, $\Delta d_p$ is a variable distance, $$\Delta d_p = d_p^t - d_p^{t-1},\ d_p^t$$

is a pedestrian distance at the current moment, and $$d_p^{t-1}$$

is a pedestrian distance at the previous moment; wherein a left and right lane change reminder logic is:

$$\text{Flag}_r = \begin{cases} v > 10 \wedge d_r \in [7, 12.5] \text{ m} \wedge \Delta v_r > -0.1 \text{ m/s} \\ 0, \text{otherwise} \end{cases},$$

wherein $d_r$ is a distance to the rear vehicle and $\Delta v_r$ is a relative speed of the rear vehicle; wherein a lane departure pre-warning trigger logic is:

$$\text{Flag}_{ld} = \begin{cases} 1, v > 60 \wedge d_{ld} \le 0 \wedge R_{lane} > 250 \wedge L \in \text{Matrix}\} \\ 0, \text{otherwise} \end{cases}$$

wherein $d_{ld}$ is a lateral distance between an outer side of a front wheel and a lane line, $R_{lane}$ is a curvature radius of the lane line, and L is the lane type.

The present invention is further configured that a front vehicle start reminder logic is:

$$\text{Flag}_{start} = \begin{Bmatrix} 1, v = 0 \wedge t_{stop} > 5 \text{ s} \wedge d_f < 6 \text{ m} \wedge \Delta d_f > 1 \text{ m} \wedge \Delta t_f > 1 \text{ s}\} \\ 0, \text{otherwise} \end{Bmatrix}$$

wherein $\text{Flag}_{start}$ is a front vehicle start state, v is an own vehicle speed, $t_{stop}$ is a parking time, $d_f$ is a distance to the front vehicle, $$\Delta = d_f = d_f^t - d_f^{t-1}$$

is a distance away from the front vehicle, $$d_f^t$$

is a distance of the front vehicle at the current moment, $$d_f^{t-1}$$

is a distance of the front vehicle at the previous moment, and $\Delta t_f$ is a away time; wherein a virtual bumper pre-warning logic is:

$$\text{Flag}_{vb} = \begin{cases} 1, & v \le 30 \wedge 2m \le d_f \le 4m \wedge v_f < 0\} \\ 0, & \text{otherwise} \end{cases},$$

wherein $\text{Flag}_{vb}$ is a virtual bumper pre-warning state, and $\Delta v_f$ is a relative speed between the own vehicle and the front vehicle.

The present invention is further configured by collecting the operation instruction state is collecting the button instruction state, wherein after collecting the button instruction state and before generating the instruction information, further includes the step of constructing a button state set, constructing the button state set: the button state set $K=\{K_{left}, K_{right}\}$, wherein K is the button state set, $K_{left}$ is a left button state, and $K_{right}$ is a right button state; wherein a video button locking logic is: $K_{left}=1 \Rightarrow M=M\cup\{index=1\}$, wherein M is a video recording set, $M=\{m_i=(I_{fi}, I_{ri}, N_i, G_i, t_i, Flag_i, index)\}$, wherein m_i is a picture frame, N is a sound information, Flag is a trigger state, index is a lock state; wherein a photograph button saving logic is: $K_{right}=1 \Rightarrow Img=Img\cup\{S_0\{I_f, I_r, G\}, t\}$, wherein Img is a photograph image set, t is a current time. ⇒

The present invention further discloses a recorder security head-up display system, which is used to implement the recorder security head-up display method. The recorder security head-up display system includes a recorder host and a head-up display device that communicate with each other wirelessly.

The recorder host includes a GPS unit, a processor, and at least one camera. The recorder host has a data acquisition module disposed thereon.

The head-up display device includes a display screen unit, a command input unit and a mainboard unit.

The head-up display device has a command generation module configured thereon.

The recorder host has a multidimensional data creation module, an algorithm analysis module, a feedback information generation module, and a command operation module disposed thereon, respectively.

The data acquisition module collects a real-time scene image and a GPS positioning data to construct an initial state set.

The multidimensional data creation module performs a physical identification on the initial state set to construct an image information set, and combines the GPS positioning data and the image information set to construct a multi-dimensional data set.

The algorithm analysis module performs data analysis on the multi-dimensional data set using algorithms, determines a driving state and generates a driving state set.

The feedback information generation module generates a feedback information according to the driving state set.

The command generation module collects an operation instruction state and generates an instruction information.

The command operation module executes a user operation according to the instruction information, locks or takes photos of the current recorded video segment of the camera.

The feedback information is displayed through the d display screen unit.

The user inputs an operation command from the command input unit according to the feedback information displayed on the display screen unit, the command input unit generates an instruction information and transmits the instruction information to the command operation module.

The command operation module executes a user operation according to the instruction information, locks or takes photos of the current recorded video segment of the camera.

The present invention further discloses a recorder security head-up display system, which is used to implement the recorder security head-up display method. The recorder security head-up display system includes a recorder host and a head-up display device that communicate with each other wirelessly.

The recorder host includes a GPS unit, a processor, and at least one camera. The recorder host has a data acquisition module disposed thereon.

The head-up display device includes a display screen unit, a command input unit and a mainboard unit.

The head-up display device has a command generation module configured thereon.

The head-up display device has the multidimensional data creation module, the algorithm analysis module, the feedback information generation module, and the command operation module disposed thereon, respectively.

The data acquisition module collects a real-time scene image and a GPS positioning data to construct an initial state set.

The multidimensional data creation module performs a physical identification on the initial state set to construct an image information set, and combines the GPS positioning data and the image information set to construct a multi-dimensional data set.

The algorithm analysis module performs data analysis on the multi-dimensional data set using algorithms, determines a driving state and generates a driving state set.

The feedback information generation module generates a feedback information according to the driving state set.

The command generation module collects an operation instruction state and generates an instruction information.

The command operation module executes a user operation according to the instruction information, locks or takes photos of the current recorded video segment of the camera.

The feedback information is displayed through the d display screen unit.

The user inputs an operation command from the command input unit according to the feedback information displayed on the display screen unit, the command input unit generates an instruction information and transmits the instruction information to the command operation module.

The command operation module executes a user operation according to the instruction information, locks or takes photos of the current recorded video segment of the camera.

The present invention provides a recorder security head-up display method and system. The method constructs an initial state set by collecting a real-time scene image and a GPS positioning data; constructs an image information set by a physically identifying the initial state set; establishes a multi-dimensional data set by combining the GPS positioning data and the image information set; analyzes the multi-dimensional data set by using algorithms to determine a driving state and generate a driving state set; generates a feedback information based on the driving state set; executes a user operation based on the instruction information; and locks or takes photos of the current recorded video segment of the camera. The beneficial effects produced include:

The multi-dimensional data fusion to improve pre-warning accuracy. The system uses an image recognition algorithm combined with a GPS positioning information to construct a variety of driving state set including "front vehicle collision pre-warning", "rear vehicle collision pre-warning", "pedestrian collision pre-warning", and "lane departure pre-warning", etc. Through multi-dimensional data analysis and status judgment, the accuracy and reliability of pre-warning are significantly improved.

Intelligently judge driving states and achieve multi-scenario safety protection. The system accurately determines driving risks through real-time calculation of parameters such as the speed of the rear vehicle, the distance to the front vehicle, the position of pedestrians, and the curvature of the lane line. For example, through the rear vehicle collision time calculation logic, pedestrian collision time judgment logic, and lane departure pre-warning logic, targeted pre-warnings can be provided in different driving scenarios to avoid traffic accidents.

Head-up display+voice reminder to reduce driver interference. Through the wireless Bluetooth communication protocol, the driving state set is transmitted to the host in real time, and feedback is provided through the display screen, indicator light, and voice broadcast. The driver can obtain driving state information without having to look down at the screen, which greatly improves driving safety and convenience.

The video can be locked to ensure evidence collection in the event of an accident. The system can save key photos and lock video clips based on the driver's button operations, ensuring that relevant photos and video evidence are automatically saved in the event of a collision or emergency, providing strong support for determining accident responsibility.

The above description is only an overview of the technical solution of the present invention. In order to more clearly understand the technical means of the present invention, it can be implemented according to the contents of the specification. In order to make the above and other purposes, features, and advantages of the present invention clearer and easier to understand, the specific implementation methods of the present invention are listed below.

BRIEF DESCRIPTION OF THE DRAWINGS

In order to more clearly illustrate the technical solutions in the embodiments of the present invention, the accompanying drawings that need to be used in the description of the embodiments will be briefly introduced below, and it is obvious that the accompanying drawings in the following description are only some embodiments of the present invention, and that for the person of ordinary skilled in the art, other drawings can also be obtained according to these accompanying drawings without paying creative work.

In the accompanying drawings:

FIG. 1 is a flow diagram of a recorder security head-up display method according to an exemplary embodiment of the present invention.

FIG. 8 is an exploded view of the head-up display device shown in FIG. 6.

Figure 2:
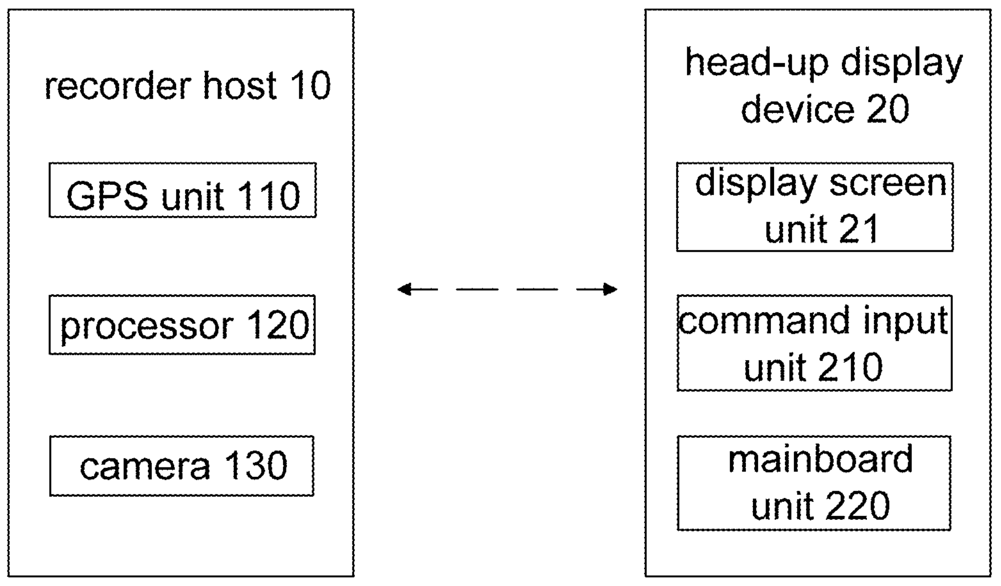
FIG. 2 is a schematic diagram of a recorder security head-up display system according to an exemplary embodiment of the present invention.

Wherein, 10 recorder host, 20 head-up display device, 110 GPS unit, 120 processor, 130 camera, 121 data acquisition module, 122 multidimensional data creation module, 123 algorithm analysis module, 124 feedback information generation module, 125 command operation module, 126 command generation module, 11 front camera, 12 rear camera, 21 display screen unit, 210 command input unit, 220 mainboard unit, 22 physical buttons, 23 buzzer, 24 indicator light, 25 housing, 26 fixing base, 27 bracket.

DETAILED DESCRIPTION OF THE PREFERRED EMBODIMENT

The embodiments of the present invention will be illustrated below with reference to the accompanying drawings and preferred embodiments, and those skilled in the art can easily understand the other advantages and effects of the present invention from the contents disclosed in the present specification. The present invention may also be implemented or applied through other different specific implementation methods, and the details in this specification may also be modified or changed in various ways based on different viewpoints and applications without departing from the spirit of the present invention. It should be understood that the preferred embodiments are only for illustrating the present invention rather than for limiting the protection scope of the present invention.

It should be noted that the illustrations provided in the following embodiments are only schematic illustrations of the basic concept of the present invention, and thus the drawings only show components related to the present invention rather than being drawn according to the number, shape and size of components in actual implementation. In actual implementation, the type, quantity and proportion of each component may be changed arbitrarily, and the component layout may also be more complicated.

In the following description, a great deal of detail is explored to provide a more thorough explanation of embodiments of the present invention, however, it will be obvious to those skilled in the art that embodiments of the invention can be carried out without these specific details, and in other embodiments, well-known structures and devices are shown in the form of block diagrams, rather than in detail, in order to avoid rendering the embodiments of the present invention difficult to understand.

Embodiment 1

A recorder security head-up display method, as shown in FIG. 1, includes:

- collecting a real-time scene image and a GPS positioning data to construct an initial state set;
- performing a physical identification on the initial state set to construct an image information set, and combining the GPS positioning data and the image information set to construct a multi-dimensional data set;
- performing data analysis on the multi-dimensional data set using algorithms to judge a driving state and generate a driving state set;
- generating a real-time feedback information according to the driving state set;
- collecting an operation instruction state and generating an instruction information; and
- performing a user operation according to the instruction information, locking or capturing the current recorded video segment of the camera.

The present invention further configures the initial state set: $S_0\{I_f, I_r, G\}$, wherein $I_f$ is a front camera image, $I_r$ is a rear camera image, and G is a positioning data output by a GPS unit.

The present invention is further configured to perform the physical identification on the initial state set to construct the image information set, constructing the image information set F={V, L, P}, wherein V is the vehicle type, L is the lane type, and P is the pedestrian state; constructing an intermediate state set $S_1$={F, G} according to the obtained image information set; and performing multidimensional data fusion on the intermediate state set $S_1$ to obtain a multi-dimensional data set D={V, L, P, X, Y}, wherein X and Y are coordinate data provided by GPS.

The present invention is further configured that the driving state set construction logic is: $S_{state}=\{Flag_r, Flag_f, Flag_p, Flag_l, Flag_{ld}, Flag_{start}, Flag_{vb}\}$, wherein $S_{state}$ is the driving state set, $Flag_r$ is a rear vehicle collision pre-warning state, $Flag_f$ is a front vehicle collision pre-warning state, $Flag_p$ is a front pedestrian collision pre-warning state, $Flag_l$ is a left and right lane change auxiliary pre-warning state, $Flag_{ld}$ is a lane departure pre-warning state, $Flag_{start}$ is a front vehicle start state, and $Flag_{vb}$ is a virtual bumper pre-warning state. Specifically, the driving state set is constructed, wherein each element represents an advance warning message, and each advance warning message has two states: advance warning 1 and non-advance warning 0. The host generates different instructions based on the corresponding advance warning to control the machine to make corresponding feedback.

The present invention is further configured as, a rear vehicle collision pre-warning trigger logic is $$Flag_r = \begin{cases} 1, & v > 30 \wedge TTC_r < 2.7s \wedge V \in \{\text{car, truck, bus}\} \\ 0, & \text{otherwise} \end{cases},$$

wherein $Flag_r$ is the rear vehicle collision pre-warning state, v is an own vehicle speed, $TTC_r$ is a rear vehicle collision time, wherein a rear vehicle collision time calculation logic is:

$$TTC_r = \frac{d_r}{|\Delta v_r|},$$

wherein $d_r$ is a distance to the rear vehicle, $|\Delta v_r| = v - v_r$ is a relative speed between the own vehicle and the rear vehicle, $v_r$ is a rear vehicle speed, and V is the vehicle type; wherein a front vehicle collision pre-warning trigger logic is:

$$\text{Flag}_f = \begin{cases} 1, & v > 30 \wedge TTC_f < 2.7s \wedge V \in \{\text{car, truck, bus}\} \\ 0, & otherwis \end{cases},$$

$\text{Flag}_f$ is the front vehicle collision pre-warning state, $TTC_f$ is a front vehicle collision time, wherein a front vehicle collision time calculation logic is:

$$TTC_f = \frac{d_f}{|\Delta v_f|},$$

$d_f$ is a distance to the front vehicle, $|\Delta v_f| = v - v_f$ is a relative speed between the own vehicle and the front vehicle, and $v_f$ is a front vehicle speed. Specifically, the rear vehicle collision pre-warning trigger logic is that when the vehicle speed v is greater than 30 km/h, the risk of rear vehicle collision begins to be judged, and $TTC_r$ starts to calculate the rear vehicle collision time, when the collision time $TTC_r$ is less than 2.7 s and the rear target vehicle is a car, truck or bus, a warning is issued, v>30 means that the vehicle speed is greater than 30, and $TTC_f$<2.7 s means that the expected collision time is less than 2.7 seconds; the front vehicle collision pre-warning trigger logic is that when the vehicle speed v is greater than 30 km/h, the risk of front vehicle collision begins to be judged, when the collision time $TTC_f$ is less than 2.7 s and the front target vehicle is a car, truck or bus, a warning is issued.

The present invention is further configured as, the pedestrian collision pre-warning trigger logic is:

$$\text{Flag}_p = \begin{cases} 1, & v > 10 \wedge TTC_p < 1.3s \wedge \Delta d_p < 0 \wedge P \in \left\{ \begin{array}{c} \text{standing, holding an umbrella, walking,} \\ \text{riding a bicycle, riding a motorcycle} \end{array} \right\} \\ 0, & \text{otherwise} \end{cases}$$

wherein $\text{Flag}_p$ is the pedestrian collision pre-warning state, v is the vehicle speed, $TTC_p$ is the pedestrian collision time, $$TTC_p = \frac{d_p}{v},$$

wherein $d_p$ is the pedestrian distance, $\Delta d_p$ is the variable distance, $$\Delta d_p = d_p^t - d_p^{t-1},\ d_p^t$$

is the pedestrian distance at the current moment, and $$d_p^{t-1}$$

is the pedestrian distance at the previous moment; a left and right lane change reminder logic is:

$$\text{Flag}_l = \begin{cases} 1, & v > 10 \wedge d_r \in [7, 12.5]m \wedge \Delta v_r > -0.1m/s \\ 0, & \text{otherwise} \end{cases},$$

wherein $d_r$ is the distance to the rear vehicle and $\Delta v_r$ is the relative speed of the rear vehicle; a lane departure pre-warning trigger logic is:

$$\text{Flag}_{ld} = \begin{cases} 1, & v > 60 \wedge d_{ld} \le 0 \wedge R_{lane} > 250 \wedge L \in \left\{ \begin{array}{c} \text{yellow solid line, white solid line,} \\ \text{yellow dashed line, white dashed line} \end{array} \right\} \\ 0, & \text{otherwise} \end{cases},$$

wherein $d_{ld}$ is the lateral distance between the outer side of the front wheel and the lane line, $R_{lane}$ is the curvature radius of the lane line, and L is the lane type. Specifically, the pedestrian collision pre-warning trigger logic is that when the vehicle speed v is greater than 10 km/h, the pedestrian collision risk begins to be judged, $TTC_p$ begins to calculate the collision time of the rear vehicle and pedestrian, and the warning is issued when the collision time $TTC_r$ is less than 1.3 s and the distance between the vehicle and the pedestrian is decreasing, and the front target is a standing pedestrian, a pedestrian holding an umbrella, a walking pedestrian, a cyclist, or a motorcyclist; the left and right lane change reminder trigger logic is that when the vehicle speed v is greater than 10 km/h and the distance to the rear vehicle is between 7 meters and 12.5 meters, the left and right lane change is judged, and a reminder is issued when the relative speed $\Delta v_r$ of the rear vehicle is greater than −0.1 m/s; the lane departure pre-warning trigger logic is that when the vehicle speed v is greater than 60 km/h, the lane departure risk begins to be judged, and the warning is issued when the lateral distance between the outer side of the front wheel and the lane line is less than 0 meters and the curvature of the lane line is greater than 250 meters, and the lane detects that the line is yellow solid line, white solid line, yellow dashed line, and white dashed line.

The present invention is further configured as, the front vehicle start reminder logic is:

$$\text{Flag}_{start} = \begin{cases} 1, & v = 0 \wedge t_{stop} > 5s \wedge d_f < 6m \wedge \Delta d_f > 1m \wedge \Delta t_f > 1s\} \\ 0, & \text{otherwise} \end{cases},$$

otherwise $\text{Flag}_{start}$ is the front vehicle start state, v is the vehicle speed, $t_{stop}$ is the parking time, $d_f$ is the distance to the front vehicle, $$\Delta d_f = d_f^t - d_f^{t-1}$$

is the distance away from the front vehicle, $$d_f^t$$

is the distance of the front vehicle at the current moment, $$d_f^{t-1}$$

is the distance of the front vehicle at the previous moment, and $\Delta t_f$ is the away time; virtual bumper pre-warning logic is:

$$\text{Flag}_{vb} = \begin{cases} 1, & v \le 30 \wedge 2m \le d_f \le 4m \wedge \Delta v_f < 0\} \\ 0, & \text{otherwise} \end{cases},$$

wherein $\text{Flag}_{vb}$ is the virtual bumper pre-warning state, and $\Delta v_f$ is the relative speed between the own vehicle and the front vehicle. Specifically, the front vehicle start reminder trigger logic is to judge the front vehicle start when the vehicle speed v is 0 km/h, the parking time $t_{stop}$ exceeds 5 s and the distance to the front vehicle $d_f$ is less than 6 m, the warning is issued when the current away distance $d_f$ is greater than 1 m and the away time $\Delta t_f$ is greater than Is; the virtual bumper pre-warning trigger logic is to start judging when the vehicle speed v is less than or equal to 30 km/h, and to issue the warning when the distance between the vehicle and the front vehicle is between 2 m and 4 m and the relative speed $\Delta v_f$ is less than 0.

The present invention is further configured that collecting the operation instruction state is collecting the button instruction state, and after collecting the button instruction state and before generating the instruction information, the present invention further comprises the step of constructing a button state set, constructing the button state set: the button state set $K=\{K_{left}, K_{right}\}$, wherein K is a button state set, $K_{left}$ is a left button state, and $K_{right}$ is a right button state; a video button locking logic is: $K_{left}=1 \Rightarrow M=M\cup\{index=1\}$, wherein M is the video recording set, $M=\{m_i=(I_{fi}, I_{ri}, N_i, G_i, t_i, Flag_i, index)\}$, wherein $m_i$ is the picture frame, N is the sound information, Flag is the trigger state, index is the lock state; the photograph button saving logic is: $K_{right}=1 \Rightarrow Img=Img\cup\{S_0\{I_f, I_r, G\}, t\}$, Img is the photograph image set, t is the current time.

Figure 6:
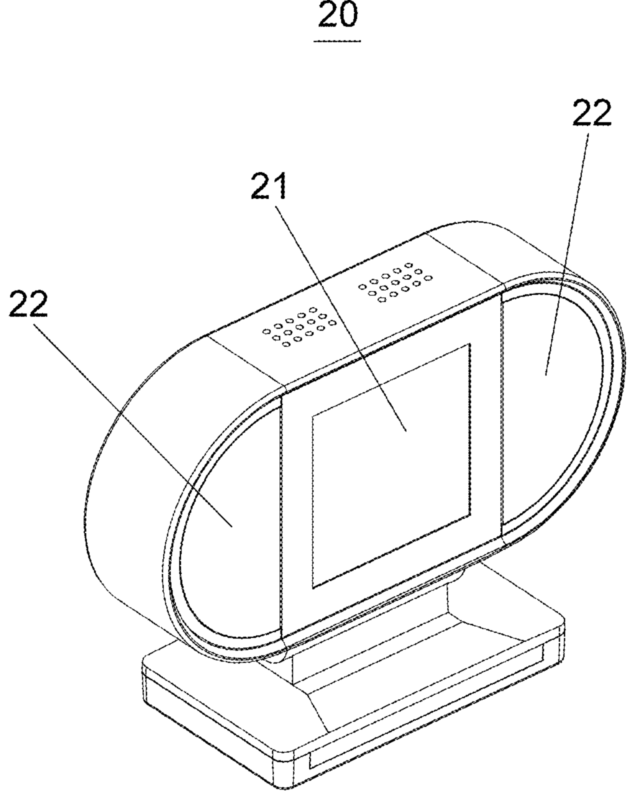
FIG. 6 is a schematic structural view of a head-up display device of the recorder security head-up display system according to an exemplary embodiment of the present invention (I).

Specifically, as shown in FIG. 6, the button state set is used to save the state information of the left and right physical buttons 22, and the video recording set is used to record the image frames of the front and rear cameras 12 at each moment and the corresponding sound information, positioning information, time information, trigger state, and lock state, wherein $K_{left}=1$ indicates that the current left button is triggered, $M=M\cup\{index=1\}$ indicates that the lock state of the video recording set is changed to locked, index is divided into locked 1 and unlocked 0, and the default is 0 unlocked state, $Flag_i$ indicates the trigger state, and determines whether an advance warning occurs in the current period. Flag; is divided into triggered 1 and normal 0, and the default is 0, which changes according to the driving state set; $K_{right}=1$ indicates that when the right physical button is triggered, $Img=Img\cup\{So\{I_f, I_r, G\}, t\}$ indicates that the system automatically saves the image information of the current moment to the image set for user viewing.

Embodiment 2

Referring to FIG. 2, the exemplary recorder security head-up display system includes a recorder host 10 and a head-up display device 20 that communicate with each other wirelessly. Specifically, the recorder host 10 and the head-up display device 20 use Bluetooth communication for information interaction.

Figure 9:
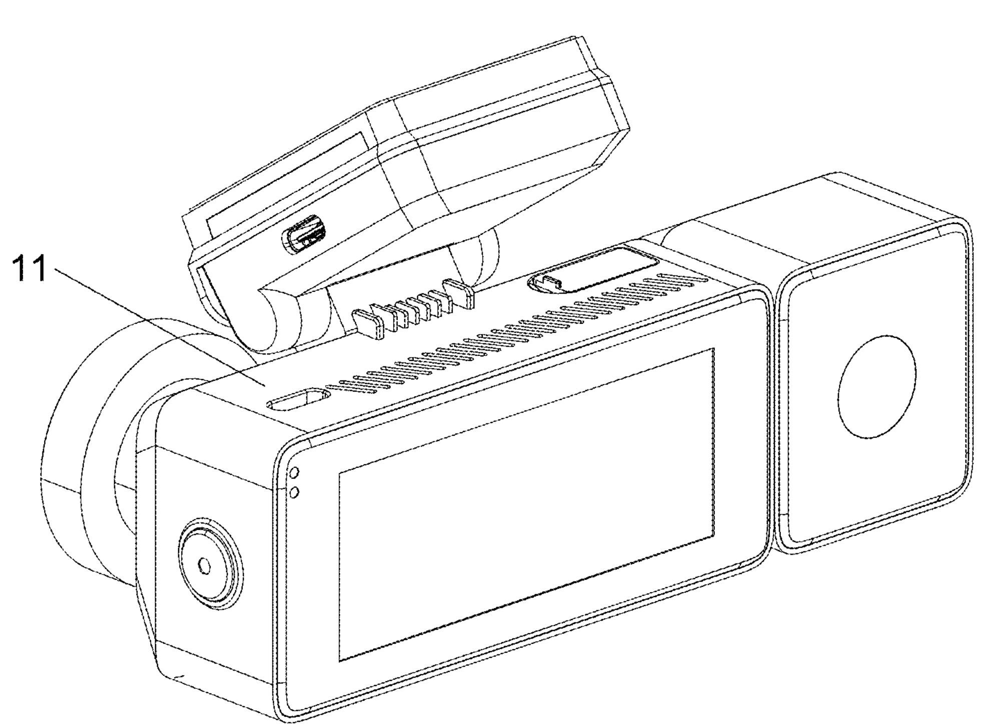
FIG. 9 is a schematic structural view of a recorder host of the head-up display device shown in FIG. 5.

The recorder host 10 includes a GPS unit 110, a processor 120, and at least one camera 130. Referring to FIG. 9, in this embodiment, the camera 130 includes at least one front camera 11. The front camera 11 captures a real-time scene image in front of the vehicle.

Figure 3:
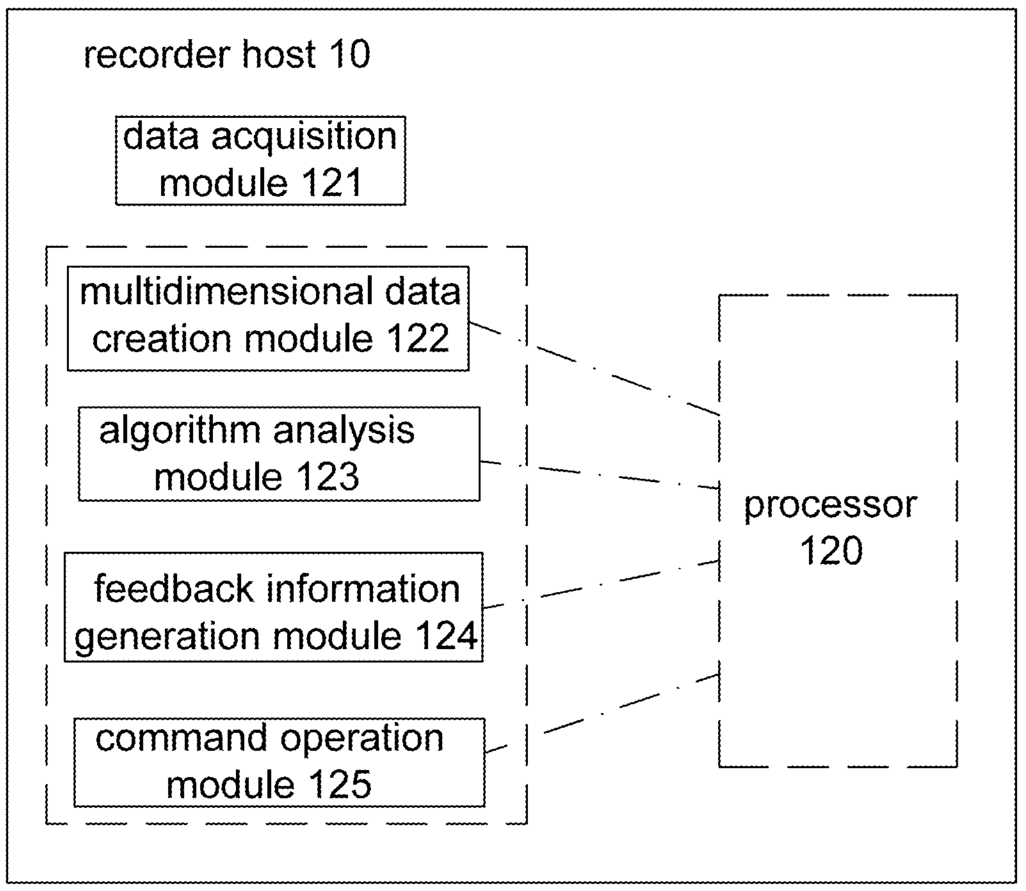
FIG. 3 is a schematic diagram showing the configuration of a recorder host according to an exemplary embodiment of the present invention.

Referring to FIG. 3, the recorder host 10 has a data acquisition module 121, a multidimensional data creation module 122, an algorithm analysis module 123, a feedback information generation module 124, and a command operation module 125 disposed thereon, respectively.

It should be noted that the multidimensional data creation module 122, the algorithm analysis module 123, the feedback information generation module 124, and the command operation module 125 are allowed to be configured in the processor 120 of the recorder host 10. The processor 120 stores a software program, wherein when the processor 120 executes the software program, the functions of the multidimensional data creation module 122, the algorithm analysis module 123, the feedback information generation module 124, and the command operation module 125 are realized.

Figure 7:
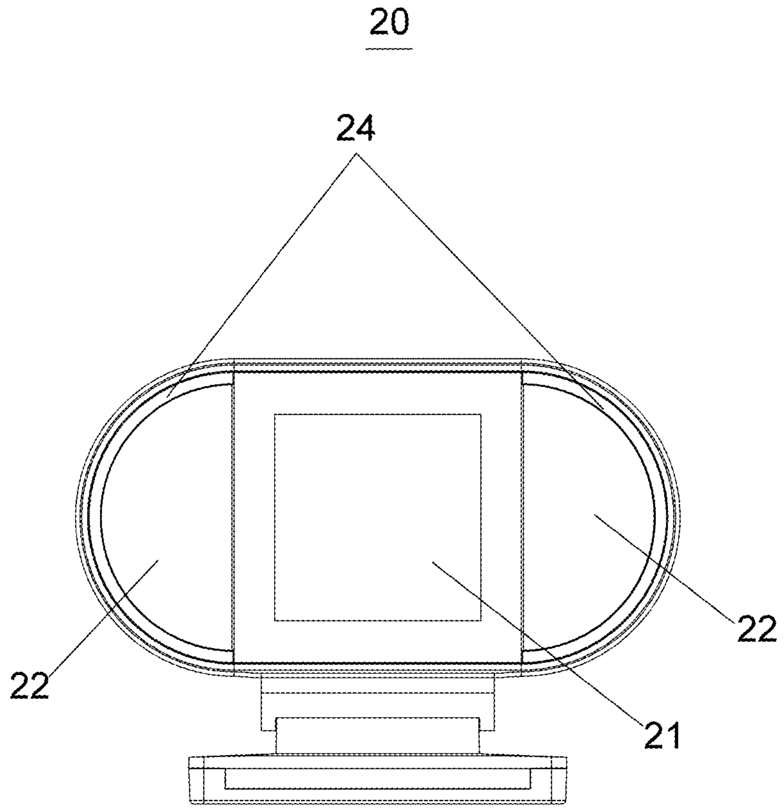
FIG. 7 is a schematic structural view of the head-up display device of the recorder security head-up display system according to an exemplary embodiment of the present invention (II).

Referring to FIG. 6, FIG. 7 and FIG. 8, the head-up display device 20 includes a display screen unit 21, a command input unit 210 and a mainboard unit 220. The recorder host 10 transmits a feedback information to the head-up display device 20 and displays the feedback information through the display screen unit 21. Specifically, the display screen unit 21 is an LED display screen. The head-up display device 2 has a command generation module 126 configured thereon.

Wherein, the data acquisition module 121: collects a real-time scene image and a GPS positioning data to construct an initial state set; it should be noted that the data acquisition module 121 allows obtaining a GPS positioning data through the GPS unit 110 and collecting a real-time scene image through the camera 130;

- the multidimensional data creation module 122: performs the physical identification on the initial state set to construct an image information set, and combines the GPS positioning data and the image information set to construct a multi-dimensional data set;

the algorithm analysis module 123: performs data analysis on the multi-dimensional data set using algorithms, determines a driving state and generates a driving state set;

the feedback information generation module 124: generates a feedback information according to the driving state set;

the command generation module 126: collects an operation instruction state and generates an instruction information; and the command operation module 125: executes a user operation according to the instruction information, locks or takes photos of the current recorded video segment of the camera.

Figure 4:
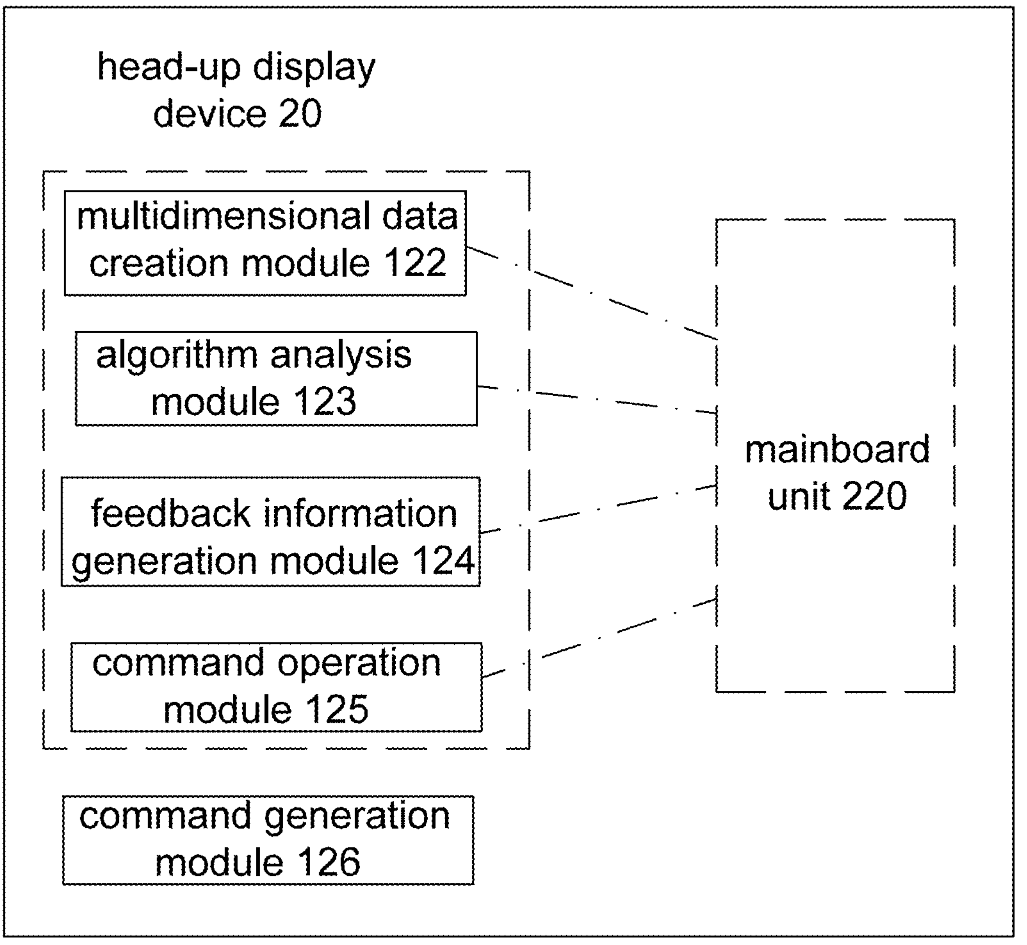
FIG. 4 is a schematic diagram showing the configuration of the head-up display device according to an exemplary embodiment of the present invention.

Referring to FIG. 4, it also needs to be noted that, in other embodiments, the multidimensional data creation module 122, the algorithm analysis module 123, the feedback information generation module 124, and the command operation module 125 are not configured in the processor 120 of the recorder host 10, but are configured in the mainboard unit 220 of the head-up display device 20. The mainboard unit 220 stores a software program. When the mainboard unit 220 executes the software program, the functions of the multidimensional data creation module 122, the algorithm analysis module 123, the feedback information generation module 124, and the command operation module 125 are realized.

The user inputs an operation command from the command input unit 210 according to the feedback information displayed on the display screen unit 21. The command input unit 210 generates an instruction information and transmits the instruction information to the command operation module 125. The command operation module 125 performs the user operation based on the instruction information to lock or take photos of the current recorded video segment of the camera.

Referring to FIG. 6, FIG. 7 and FIG. 8, as a preferred embodiment, the head-up display device 20 further includes one or more physical buttons 22, a buzzer 23, an indicator light 24, a rechargeable battery, and a housing 25 disposed thereon, respectively.

The one or more physical buttons 22, the buzzer 23, the indicator light 24, and the rechargeable battery are respectively connected with the mainboard unit 220. The buzzer 23 is arranged in the housing 25, and the indicator light 24 is installed on the housing 25. Of course, in other embodiments, the head-up display 20 does not include a rechargeable battery, but is powered by an external power supply via a power cord.

Figure 5:
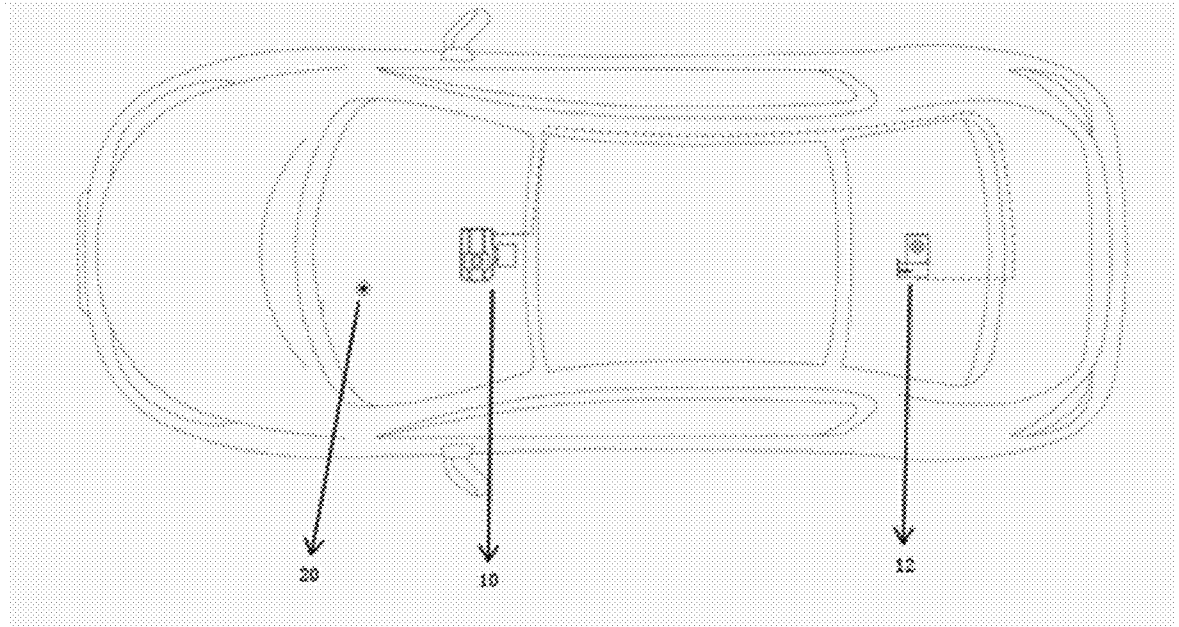
FIG. 5 is a schematic diagram of the installation of the recorder security head-up display system according to an exemplary embodiment of the present invention.

Referring to FIG. 5, as a preferred embodiment, the recorder security head-up display system further includes a rear camera 12, and the rear camera 12 is installed at the rear end of the vehicle to collect the real-time scene image behind the vehicle.

The recorder host 10 has a front camera 11 built in. The image data is collected by the front camera 11 and the rear camera 12. The recorder host 10 has a GPS unit 110 built in, and the positioning information is obtained by collecting GPS data. The processor constructs an initial state set based on the collected information for saving the initial image and position information.

The physical identification is performed on the initial state set to construct an image information set, and a multi-dimensional data set is established by combining the GPS positioning data and the image information set.

Specifically, the processor uses an image recognition algorithm to separate the initial image data collected by the front camera 11, the rear camera 12 and the GPS unit 110 to obtain a basic image information set, wherein the basic image information set includes a vehicle type, a lane type and a pedestrian status, and the separated information is multi-dimensionally fused with the GPS position information to obtain a multi-dimensional data set, which forms a basis for a later state algorithm.

The processor uses an algorithm to perform data analysis on the multidimensional data, determine the driving state, and generate a driving state set; and further generates the real-time feedback information based on the driving state set. The processor transmits the real-time feedback information to the head-up display device 20 via Bluetooth communication. The mainboard unit 220 of the head-up display device 20 is displayed through the display screen unit 21, or the alarm sound is played through the buzzer 23, or the indication is made through the indicator light 24; the user responds according to the feedback information displayed on the display screen, or according to the alarm information of the buzzer 23, or according to the indication information of the indicator light 24; if the instruction information is input through physical buttons, the mainboard unit 220 of the head-up display device 20 executes the user operation according to the instruction information, and locks or takes photos of the current recorded video segment of the camera.

When the system detects that a certain element state in the driving state set is 1, a corresponding advance warning message is sent to the recorder host 10 according to different elements, and the display screen unit 21, the indicator light 24, and the buzzer 23 are mobilized to produce different feedback effects according to the advance warning message. As shown in FIG. 5, the head-up display device 20 is installed above the vehicle dashboard or above the center console to facilitate observation and operation without affecting safe driving, and communicates with the recorder host 10 via wireless Bluetooth two-way communication while the vehicle is driving. The head-up display device 20 obtains the driving state and instruction from the recorder host 10 and is displayed intuitively. The indicator light 24 displays different colors according to different advance warning message to remind the driver and ensure driving safety.

Referring to FIG. 8, the head-up display device 20 further includes a fixing base 26 and a bracket 27, wherein the mainboard unit 220, the buzzer 23 and the rechargeable battery are arranged in the housing 25, wherein the display screen unit 21 and the physical buttons 22 are installed on the housing 25, wherein the housing 25 is detachably connected with the top of the bracket 27. The bottom of the bracket 27 is snap-connected with the top of the fixing base 26, and the fixing base 26 has an adhesive plate disposed at the bottom thereof. The housing 25 is detachably connected with the top of the bracket 27, and the bottom of the bracket 27 is snap-connected with the top of the fixing base 26, so that the head-up display device 20 is easy to disassemble and assemble quickly. The adhesive plate is provided at the bottom of the fixing base 26 to facilitate fixing the head-up display device 20 above the dashboard or above the center console of the vehicle.

It should be noted that the recorder security head-up display system provided in the above embodiment and the recorder security head-up display method provided in the above embodiment belong to the same concept, and the specific way in which each module and unit performs the operation has been described in detail in the method embodiment and will not be repeated here. In actual applications, the recorder security head-up display system provided in the above embodiment can distribute the above functions to different functional modules as needed, that is, divide the internal structure of the system into different functional modules to complete all or part of the functions described above, and this is not limited here.

The above embodiments may be implemented in whole or in part through software, hardware, firmware or any other combination. When implemented using software, the above embodiments may be implemented in whole or in part in the form of a computer program product. The computer program product includes one or more computer instructions or computer programs. When the computer instructions or computer programs are loaded or executed on a computer, the processes or functions described in the embodiments of the present invention are generated in whole or in part. The computer may be a general purpose computer, a special purpose computer, a computer network, or other programmable device. The computer instructions may be stored in a computer-readable storage medium or transmitted from one computer-readable storage medium to another computer-readable storage medium. For example, the computer instructions may be transmitted from one website, computer, server, or data center to another website, computer, server, or data center by wired (or infrared, wireless, microwave, etc.) means.

The computer-readable storage medium may be any available medium that can be accessed by a computer, or may be a data storage device such as a server or a data center that includes a collection of one or more available medium. The available medium may be a magnetic medium (e.g., a floppy disk, a hard disk, or a magnetic tape), an optical medium (e.g., a DVD), or a semiconductor medium. The semiconductor medium may be a solid state drive.

It should be understood that the term "and/or" in this article is merely a description of the association relationship of associated objects, indicating that three relationships may exist. For example, A and/or B can mean the existence of A alone, the existence of A and B at the same time, and the existence of B alone, where A and B can be singular or plural. In addition, the character '/' generally indicates an 'or' relationship between the previous and next associated objects in this article, but it may also indicate an 'and/or' relationship. Refer to the previous and next contexts for a clearer understanding.

In the present invention, "at least one" means one or more, and "plurality" or "multiple" means two or more. "At least one of the following items (pcs)" or similar expressions refers to any combination of these items, including any combination of single items (pcs) or plural items (pcs). For example, at least one of a, b, or c, can represent a, b, c, a-b, a-c, b-c, or a-b-c, where a, b, and c can be single or multiple.

It should be understood that in the various embodiments of the present invention, the magnitude of the numerical sequence number of the above processes does not imply the order of execution, and the order of execution of each process shall be determined by its function and internal logic, and shall not constitute any limitation on the implementation of the embodiments of the present invention.

Those skilled in the art will appreciate that the units and algorithm steps of each example described in conjunction with the embodiments disclosed herein may be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of this application.

Those skilled in the art can clearly understand that, for the convenience and brevity of description, the specific working processes of the systems and units described above can refer to the corresponding processes in the aforementioned method embodiments and will not be repeated here.

In several embodiments provided by the present invention, it should be understood that the disclosed system can be implemented in other ways. For example, the embodiments described above are only schematic, for example, the division of the units is only a logical function division, and there may be another division mode when it is actually implemented, such as a plurality of units or components can be combined or can be integrated into another system, or some features can be ignored or not executed. On the other hand, the mutual coupling or direct coupling or communication connection shown or discussed may be through some interface, wherein the indirect coupling or communication connection of the units may be electrical, mechanical or other forms.

The units described as separate components may or may not be physically separated, and the components displayed as units may or may not be physical units, that is, they may be located in one place or distributed over multiple network units. Some or all of the units may be selected according to actual needs to achieve the purpose of the solution of this embodiment.

In addition, each functional unit in each embodiment of the present invention may be integrated into one processing unit, or each unit may exist physically separately, or two or more units may be integrated into one unit.

The function may be stored in a computer-readable storage medium if it is realized in the form of a software function unit and is sold or used as an independent product. Based on such an understanding, the technical solution of the present invention, or the part that contributes to the prior art, or the part of the technical solution, can be embodied in the form of a software product. The computer software product is stored in a storage medium and includes a number of instructions for enabling a computer device (which can be a personal computer, a server, or a network device, etc.) to execute all or part of the steps of the method described in each embodiment of the present invention. The aforementioned storage medium includes a U disk, a mobile hard disk, a read-only memory (ROM), a random access memory (RAM), a magnetic disk or an optical disk, etc., which can store program codes.

The foregoing is only the specific embodiment of the present invention, but the scope of protection of the present invention is not limited to this, and any person skilled in the art who is familiar with the art of the present invention can easily think of changes or substitutions within the scope of the technology disclosed in the present invention, shall be covered by the scope of protection of the present invention. Therefore, the protection scope of the present invention should be based on the protection scope of the claims.

What is claimed is:

1. A recorder security head-up display method, comprising:

collecting a real-time scene image and a GPS positioning data to construct an initial state set;

performing a physical identification on the initial state set to construct an image information set, and combining the GPS positioning data and the image information set to construct a multi-dimensional data set;

performing data analysis on the multi-dimensional data set using algorithms to judge a driving state and generate a driving state set;

generating a real-time feedback information according to the driving state set;

collecting an operation instruction state and generating an instruction information; and performing a user operation according to the instruction information, locking or capturing the current recorded video segment of the camera.

2. The recorder security head-up display method, as recited in claim 1, wherein the initial state set is: $S_0\{I_f, I_r, G\}$, wherein $I_f$ is a front camera image, $I_r$ is a rear camera image, and G is a positioning data output by a GPS unit.

3. The recorder security head-up display method, as recited in claim 1, performing the physical identification on the initial state set to construct the image information set, constructing the image information set F={V, L, P}, wherein V is a vehicle type, L is a lane type, and P is a pedestrian state; constructing an intermediate state set $S_1$={F, G} according to the obtained image information set; and performing a multidimensional data fusion on the intermediate state set S_1 to obtain a multi-dimensional data set D={V, L, P, X, Y}, wherein X and Y are the coordinate data provided by GPS.

4. The recorder security head-up display method, as recited in claim 1, wherein a driving state set construction logic is: $S_{state}=\{Flag_r, Flag_f, Flag_p, Flag_l, Flag_{ld}, Flag_{start}, Flag_{vb}\}$, wherein $S_{state}$ is the driving state set, $Flag_r$ is a rear vehicle collision pre-warning state, $Flag_f$ is a front vehicle collision pre-warning state, $Flag_p$ is a front pedestrian collision pre-warning state, $Flag_l$ is a left and right lane change auxiliary pre-warning state, $Flag_{ld}$ is a lane departure pre-warning state, $Flag_{start}$ is a front vehicle start state, and $Flag_{vb}$ is a virtual bumper pre-warning state.

5. The recorder security head-up display method, as recited in claim 4, wherein a rear vehicle collision pre-warning trigger logic is:

$$Flag_r = \begin{cases} 1, v > 30 \wedge TTC_r < 2.7\text{ s } \wedge V \in \{\text{car, truck, bus}\} \\ 0, \text{otherwise} \end{cases},$$

wherein $Flag_r$ is the rear vehicle collision pre-warning state, v is an own vehicle speed, $TTC_r$ is a rear vehicle collision time, wherein a rear vehicle collision time calculation logic is:

$$TTC_r = \frac{d_r}{|\Delta v_r|},$$

wherein $d_r$ is a distance to the rear vehicle, $|\Delta v_r|=v-v_r$ is a relative speed between the own vehicle and the rear vehicle, $v_r$ is a rear vehicle speed, and V is the vehicle type; wherein a front vehicle collision pre-warning trigger logic is:

$$Flag_f = \begin{cases} 1, v > 30 \wedge TTC_f < 2.7\text{ s } \wedge V \in \{\text{car, truck, bus}\} \\ 0, \text{otherwis} \end{cases},$$

$Flag_f$ is the front vehicle collision pre-warning state, $TTC_f$ is a front vehicle collision time, wherein a front vehicle collision time calculation logic is:

$$TTC_f = \frac{d_f}{|\Delta v_f|},$$

$d_f$ is a distance to the front vehicle, $|\Delta v_f|=v-v_f$ is a relative speed between the own vehicle and the front vehicle, and $v_f$ is a front vehicle speed.

6. The recorder security head-up display method, as recited in claim 4, wherein a pedestrian collision pre-warning trigger logic is:

$$Flag_p = \begin{cases} 1, v > 10 \wedge TTC_p < 1.3\text{ s } \wedge \Delta d_p < 0 \wedge P \in \left\{\begin{matrix}\text{standing, holding} \\ \text{an umbrella,} \\ \text{walking,} \\ \text{riding a bicycle,} \\ \text{riding a} \\ \text{motorcycle}\end{matrix}\right\} \\ 0, \text{otherwise} \end{cases},$$

wherein $Flag_p$ is a pedestrian collision pre-warning state, v is an own vehicle speed, $TTC_p$ is a pedestrian collision time, wherein $$TTC_p = \frac{d_p}{v},$$

wherein $d_p$ is a pedestrian distance, $\Delta d_p$ is a variable distance, $$\Delta d_p = d_p^t - d_p^{t-1},\ d_p^t$$

is a pedestrian distance at the current moment, and $$d_p^{t-1}$$

is a pedestrian distance at the previous moment; wherein a left and right lane change reminder logic is:

$$Flag_l = \begin{cases} 1, v > 10 \wedge d_r \in [7, 12.5]\text{ m} \wedge \Delta v_r > -0.1\text{ m/s} \\ 0, \text{otherwise} \end{cases},$$

wherein $d_r$ is a distance to the rear vehicle and $\Delta v_r$ is a relative speed of the rear vehicle; wherein a lane departure pre-warning trigger logic is:

$$Flag_{ld} = \begin{cases} 1, v > 60 \wedge d_{ld} \le 0 \wedge R_{lane} > 250 \wedge L \in \left\{\begin{matrix}\text{yellow solid line,} \\ \text{white solid line,} \\ \text{yellow dashed line,} \\ \text{white dashed line}\end{matrix}\right\} \\ 0, \text{otherwise} \end{cases},$$

wherein $d_{ld}$ is a lateral distance between an outer side of a front wheel and a lane line, $R_{lane}$ is a curvature radius of the lane line, and L is the lane type.

7. The recorder security head-up display method, as recited in claim 4, wherein a front vehicle start reminder logic is:

$$\text{Flag}_{start} = \begin{cases} 1, v = 0 \wedge t_{stop} > 5\text{ s} \wedge d_f < 6\ m \wedge \Delta d_f > 1\ m \wedge \Delta t_f > 1\text{ s}\} \\ 0,\text{ otherwise} \end{cases},$$

wherein $\text{Flag}_{start}$ is a front vehicle start state, v is an own vehicle speed, $t_{stop}$ is a parking time, $d_f$ is a distance to the front vehicle, $$\Delta d_f = d_f^t - d_f^{t-1}$$

is a distance away from the front vehicle, $$d_f^t$$

is a distance of the front vehicle at the current moment, $$d_f^{t-1}$$

is a distance of the front vehicle at the previous moment, and $\Delta t_f$ is an away time; wherein a virtual bumper pre-warning logic is:

$$\text{Flag}_{vb} = \begin{cases} 1, v \le 30 \wedge 2\text{ m} \le d_f \le 4\ m \wedge \Delta v_f < 0\} \\ 0,\text{ otherwise} \end{cases},$$

wherein $\text{Flag}_{vb}$ is a virtual bumper pre-warning state, and $\Delta v_f$ is a relative speed between the own vehicle and the front vehicle.

8. The recorder security head-up display method, as recited in claim 1, wherein collecting the operation instruction state is collecting the button instruction state, wherein after collecting the button instruction state and before generating the instruction information, further comprises the step of constructing a button state set, constructing the button state set: the button state set $K=\{K_{left}, K_{right}\}$, wherein K is the button state set, $K_{left}$ is a left button state, and $K_{right}$ is a right button state; wherein a video button locking logic is: $K_{left}=1 \Rightarrow M=M\cup\{index=1\}$, wherein M is a video recording set, $M=\{m_i=(I_{fi}, I_{ri}, N_i, G_i, t_i, Flag_i, index)\}$, wherein $m_i$ is a picture frame, N is a sound information, Flag is a trigger state, index is a lock state; wherein a photograph button saving logic is: $K_{right}=1 \Rightarrow Img=Img\cup\{S_0\{I_f, I_r, G\}, t\}$, wherein Img is a photograph image set, t is a current time.

9. A recorder security head-up display system, comprising a recorder host and a head-up display device that communicate with each other wirelessly;

- the recorder host comprising a GPS unit, a processor, and at least one camera; the recorder host having a data acquisition module disposed thereon;
- the head-up display device comprising a display screen unit, a command input unit and a mainboard unit;
- the head-up display device having a command generation module configured thereon;
- the recorder host having a multidimensional data creation module, an algorithm analysis module, a feedback information generation module, and a command operation module disposed thereon, respectively;
- wherein the data acquisition module collects a real-time scene image and a GPS positioning data to construct an initial state set;
- wherein the multidimensional data creation module performs a physical identification on the initial state set to construct an image information set, and combines the GPS positioning data and the image information set to construct a multi-dimensional data set;
- wherein the algorithm analysis module performs data analysis on the multi-dimensional data set using algorithms, determines a driving state and generates a driving state set;
- wherein the feedback information generation module generates a feedback information according to the driving state set;
- wherein the command generation module collects an operation instruction state and generates an instruction information;
- wherein the command operation module executes a user operation according to the instruction information, locks or takes photos of the current recorded video segment of the camera;
- wherein the feedback information is displayed through the display screen unit;
- wherein the user inputs an operation command from the command input unit according to the feedback information displayed on the display screen unit, the command input unit generates an instruction information and transmits the instruction information to the command operation module;
- wherein the command operation module executes a user operation according to the instruction information, locks or takes photos of the current recorded video segment of the camera.

10. The recorder security head-up display system, as recited in claim 9, wherein the head-up display device comprises a housing, a buzzer, and an indicator light, wherein the buzzer is arranged in the housing, and the indicator light is installed on the housing.

11. The recorder security head-up display system, as recited in claim 9, wherein the head-up display device further comprises a fixing base and a bracket, wherein the mainboard unit is arranged in the housing, wherein the housing is detachably connected with the top of the bracket, wherein the bottom of the bracket is snap-connected with the top of the fixing base.

12. A recorder security head-up display system, comprising a recorder host and a head-up display device that communicate with each other wirelessly;

- the recorder host comprising a GPS unit, a processor, and at least one camera; the recorder host having a data acquisition module disposed thereon;
- the head-up display device comprising a display screen unit, a command input unit and a mainboard unit;
- the head-up display device having a command generation module configured thereon;
- the head-up display device having the multidimensional data creation module, the algorithm analysis module, the feedback information generation module, and the command operation module disposed thereon, respectively;
- wherein the data acquisition module collects a real-time scene image and a GPS positioning data to construct an initial state set;
- wherein the multidimensional data creation module performs a physical identification on the initial state set to construct an image information set, and combines the GPS positioning data and the image information set to construct a multi-dimensional data set;

wherein the algorithm analysis module performs data analysis on the multi-dimensional data set using algorithms, determines a driving state and generates a driving state set;

wherein the feedback information generation module generates a feedback information according to the driving state set;

wherein the command generation module collects an operation instruction state and generates an instruction information;

wherein the command operation module executes a user operation according to the instruction information, locks or takes photos of the current recorded video segment of the camera;

wherein the feedback information is displayed through the display screen unit;

wherein the user inputs an operation command from the command input unit according to the feedback information displayed on the display screen unit, the command input unit generates an instruction information and transmits the instruction information to the command operation module;

wherein the command operation module executes a user operation according to the instruction information, locks or takes photos of the current recorded video segment of the camera.

* * * * *